United States Patent
Dueppers

(10) Patent No.: US 7,499,884 B2
(45) Date of Patent: Mar. 3, 2009

(54) INTEREST CALCULATION TOOL

(75) Inventor: Johannes Gustav Dueppers, Leimen (DE)

(73) Assignee: Sap AG, Walldorf (DE)

( * ) Notice: Subject to any disclaimer, the term of this patent is extended or adjusted under 35 U.S.C. 154(b) by 883 days.

(21) Appl. No.: 10/740,859

(22) Filed: Dec. 22, 2003

(65) Prior Publication Data
US 2005/0071398 A1 Mar. 31, 2005

Related U.S. Application Data

(60) Provisional application No. 60/506,769, filed on Sep. 30, 2003.

(51) Int. Cl.
*G06Q 40/00* (2006.01)

(52) U.S. Cl. .............................. 705/37; 705/38; 705/36; 705/35

(58) Field of Classification Search ............. 705/35–38, 705/5
See application file for complete search history.

(56) References Cited

U.S. PATENT DOCUMENTS

| | | | |
|---|---|---|---|
| 6,021,397 A | * | 2/2000 | Jones et al. ............... 705/36 R |
| 6,038,550 A | * | 3/2000 | Rosenwald ................. 705/35 |
| 2001/0042785 A1 | * | 11/2001 | Walker et al. ............... 235/379 |
| 2001/0056391 A1 | | 12/2001 | Schultz |
| 2003/0120566 A1 | | 6/2003 | Lipschutz et al. |
| 2004/0117302 A1 | * | 6/2004 | Weichert et al. .............. 705/40 |

OTHER PUBLICATIONS

Further Evidence on the Corporate Use of Derivatives in Australia: The Case of Foreign Currency and Interest Rate Instruments Hoa Nguyen, Robert Faff. Australian Journal of Management. Sydney: Dec. 2003. vol. 28, Iss. 3; pg. 307, 11 pgs.*
The Real Cancun Celso Amorim, Wall Street Journal. (Eaastern edition), New York, N.Y.: Sep. 25, 2003, p. A. 18.*
Further Evidence on the Corporate Use of Derivatives in Australia . . . .; Nguyen et al., Australian Journal of Mgmt., Sydey, Dec. 2003, vol. 28, Iss 3, p. 307.

* cited by examiner

*Primary Examiner*—Frantzy Poinvil
*Assistant Examiner*—Clement Graham
(74) *Attorney, Agent, or Firm*—Kenyon & Kenyon LLP

(57) ABSTRACT

Embodiments of the present invention relate to a computer-implemented method and system for performing interest calculations on account balances. The calculations may be based on time intervals of less than a day, and using time parameters defined in terms of seconds.

9 Claims, 4 Drawing Sheets

INTEREST CALCULATION TOOL

CROSS-REFERENCE TO RELATED APPLICATIONS

This application claims the benefit of U.S. provisional application Ser. No. 60/506,769, filed Sep. 30, 2003.

FIELD OF THE INVENTION

Embodiments of the present invention relate to computers and computer software, and more specifically to a computer-implemented method and system for interest calculation.

BACKGROUND INFORMATION

When interest is calculated on money in a bank account, the way the calculation is performed is typically based at least partly on the contractual terms applicable to the account. For example, in typical personal bank accounts, interest calculations by contract are based on the account balance at the end of a business day. More specifically, for example, to accrue or charge interest to an account and produce a monthly account statement, the daily recorded end-of-day balances of the account over a period of, say, thirty days may be used to calculate interest. Because the only relevant time interval in such a calculation is the business day, typically only the date (as opposed to more precise time information) of a transaction which alters the account balance is recorded and used in the interest calculation.

However, developments in the business world have led to an increasing demand for greater precision in the calculation of interest. For example, because data processing technology is currently able to transfer large amounts of money between accounts in "real time"—that is, in practical terms, almost instantaneously—often the balance in an account can fluctuate dramatically within the course of a single business day. When interest is only calculated based on a net account balance at the end of the business day, such fluctuations may not be accurately registered in terms of potential corresponding interest charges, which may mean that banks offering such real-time transfer services lose out on large interest revenues.

For example, suppose 10,000 currency units are withdrawn from a bank account at 8:00 A.M., the beginning of the bank's business day, leaving a negative balance for the account of −10,000 currency units. Then, suppose the 10,000 currency units are re-deposited in the account at 4:00 P.M., the end of the bank's business day, leaving a net balance on the account for the day of 0 (zero) currency units. If an interest calculation is only performed based on the net account balance at the end of the day, i.e., on an account balance of zero, the bank has, in effect, lent the withdrawer the 10,000 currency units for the day free of interest.

Banks may offer real-time services, for example, in connection with a known "continuous linked settlement" (CLS) system. The CLS system links member banks internationally and enables real-time transactions. In particular, the CLS system is favored because it reduces settlement risk associated with large foreign currency transactions. Banks that are members of the CLS system may offer real-time transaction services to non-member banks. Such member banks have recognized that these real-time services should have corresponding interest calculation that reflects their possibly rapidly fluctuating nature, and may form contracts with non-member banks accordingly. That is, as a condition of providing real-time transaction services, banks providing the services may contract with banks receiving the services that the banks receiving the services will pay interest based on more precise calculations than the traditional calculations based on end-of-day balances.

In view of the foregoing considerations, there is a need for a method and system to provide more precise interest calculation than has heretofore been available.

SUMMARY OF THE INVENTION

Embodiments of the present invention relate to performing interest calculation using precise time parameters. For example, time units as short as one second could be used in interest calculation. The interest calculation could be performed for intervals of less than the span of a day. According to the embodiments, valuation times that determine when a corresponding account balance is to be used in an interest calculation may be defined down to the date, hour, minute and second. The valuation times and associated interest rates may establish valuation intervals for which interest is calculated. A number of seconds in each of the valuation intervals may be determined, and the number of seconds used in the interest calculation. Because dividing interest calculation time intervals for interest calculation into such fine units is able to capture rapid fluctuations in an account balance, greater precision in the calculation of interest as compared to known arrangements is achieved.

DETAILED DESCRIPTION

Figure 1:
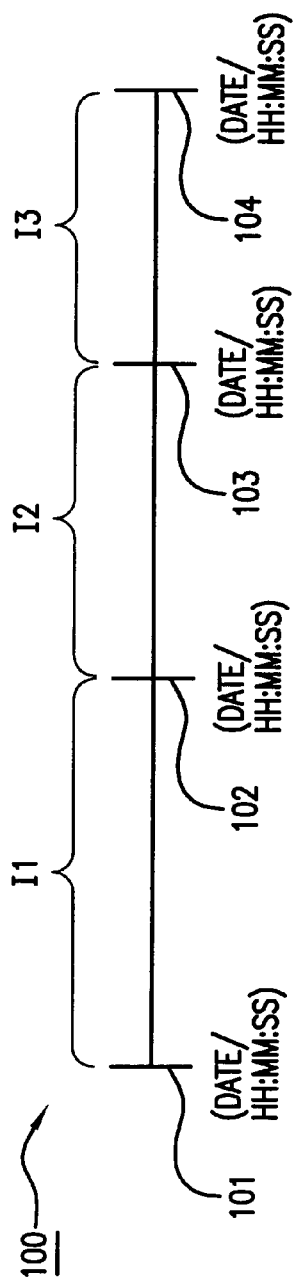
FIGS. 1-3 show calculation periods and valuation intervals according to embodiments of the present invention.

Embodiments of the present invention relate to interest calculation using precise time parameters. FIG. 1 shows an example of an interest calculation period 100 which may be used for purposes of illustrating operations according to the present invention. The calculation period 100 may include a start point 101 defined in terms of date, hour, minute and second, and an end point 104 defined in terms of date, hour, minute and second. The calculation period may be less than 24 hours long, but need not be. The calculation period 100 may further include a plurality of interest condition data points such as 102 and 103. Each of the interest condition data points may have associated therewith an effective interest rate and an effective time point defined by date, hour, minute and second. Each interest condition data may set an effective interest rate for a corresponding effective interest rate interval. For example, interest condition data points 102 and 103 define an effective interest rate interval where an effective interest rate I2 is set by interest condition data point 102. A different effective interest rate I1 may apply for a preceding effective interest rate interval defined by start point 101 and interest condition data point 102. Similarly, a different effective interest rate I3 may apply for a subsequent effective interest rate interval defined by interest condition data point 103 and end point 104.

Figure 2:
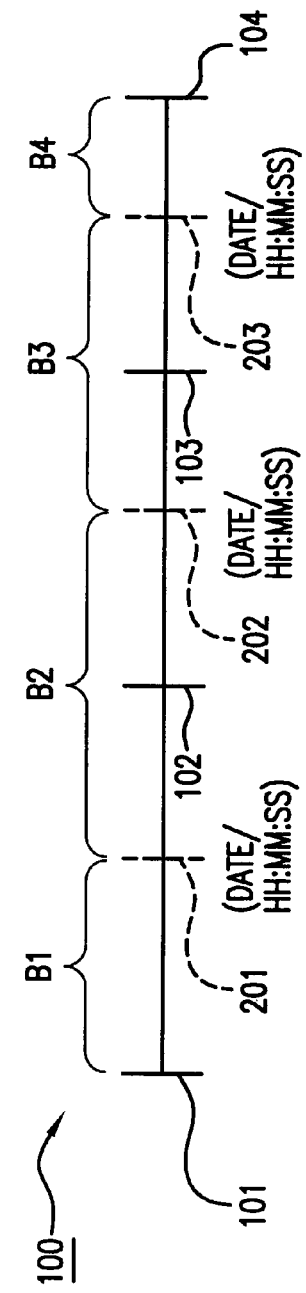

Referring to FIG. 2, valuation date data may be associated with the calculation period 100. The valuation date data may include valuation points such as 201, 202 and 203, each defined by date, hour, minute and second. The valuation points may correspond to changes in a balance of an account, for example due to a deposit or withdrawal. Thus, an account may have a balance B1 between start point 101 and valuation point 201, a balance B2 different from B1 between valuation point 201 and valuation point 202, a balance B3 different from B2 between valuation point 202 and valuation point 203, and a balance B4 different from B3 between valuation point 203 and end point 104.

Figure 3:
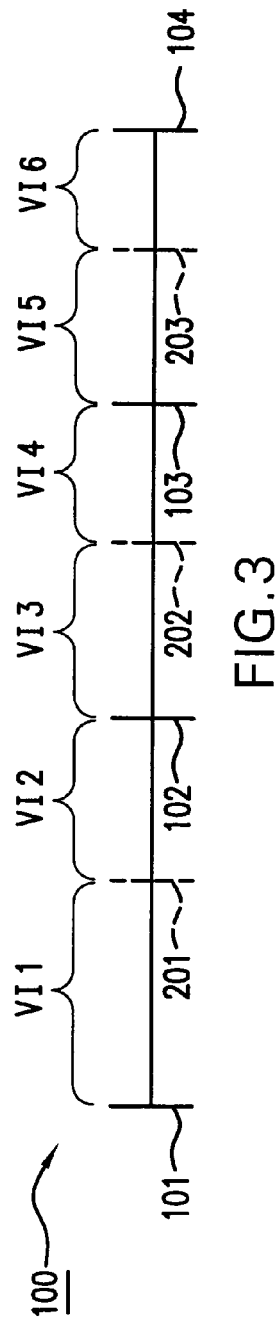

Referring to FIG. 3, the valuation points and the interest condition data points may define valuation intervals. A valuation interval (VI) may be defined by a corresponding constant effective interest rate and a constant balance. For example, in a valuation interval VI1, the account balance is B1 and the effective interest rate is I1. In a valuation interval VI2, the account balance is B2 and the effective interest rate is I1. In a valuation interval VI3, the account balance is B2 and the effective interest rate is I2. In a valuation interval VI4, the account balance is B3 and the effective interest rate is I2. In a valuation interval VI5, the account balance is B3 and the effective interest rate is I3. In a valuation interval VI6, the account balance is B4 and the effective interest rate is I3.

It is noted that a calculation period such as calculation period 100 need not necessarily include changes in effective interest rate or balance. For example, in a situation where there was no change in interest rate and balance between the start and end points of a calculation period, the valuation interval would be defined by the start and end points of the calculation period. On the other hand, in a situation where only the effective interest rates changed during a calculation period, the valuation intervals would be defined by the interest condition data points: i.e., the valuation intervals would correspond to the effective interest rate intervals as described in connection with FIG. 1. In yet another possible situation, only the balance might change during a calculation period. Here, the valuation points would define the valuation intervals.

According to embodiments of the present invention, an interest may be calculated for each valuation interval. For instance, a time parameter corresponding to a valuation interval may be used in an interest calculation formula. There exist many different kinds of interest calculation formulas; one example is as follows:

Int=[(calculation basis amount)×(effective interest rate)×(no. of days+(time)/86400)]/[(100)×(basis days)].

Here, a valuation interval as determined according to the above could be substituted for the time parameter. According to embodiments, the number of seconds in the valuation interval may be determined, and the number of seconds used as the time parameter.

For purposes of illustration, some examples using specific numbers follow. Assume that:

Time corresponding to start point 101=00:00:00
Time corresponding to interest condition data point 102=09:30:00
Time corresponding to interest condition data point 103=17:15:00
Time corresponding to end point 104=00:00:00 (24 hours from start point 101)
I1=14%
I2=16%
I3=15%
Time corresponding to valuation point 201=05:23:19
Time corresponding to valuation point 202=14:10:55
Time corresponding to valuation point 203=21:00:57

B2=10,000,000
B3=18,000,000
B4=16,000,000
Thus,
VI2=05:23:19–09:30:00; no. of seconds=14,801
VI3=09:30:00–14:10:55; no. of seconds=16,855
VI4=14:10:55–17:15:00; no. of seconds=11,045
VI5=17:15:00–21:00:57; no. of seconds=13,557
VI6=21:00:57–00:00:00; no. of seconds=10,743

Using the above numbers and interest formula Int above, where calculation basis amount=B2, B3 or B4, effective interest rate=I1, I2 or I3 as applicable, no. of days=0 (zero) and basis days=360, and for the time parameter, substituting the corresponding number of seconds for each of VI2, VI3, VI4, VI5 and VI6, the following results are obtained:

Accrued interest for VI2=666.19727
Accrued interest for VI3=867.02675
Accrued interest for VI4=1,022.68519
Accrued interest for VI5=1,176.82292
Accrued interest for VI6=828.93519

In the foregoing example, all the balances were positive, and so all the calculations resulted in interest accruals. Of course, more generally, balances could be negative, which would result in interest charges as opposed to interest accruals.

Figure 4:
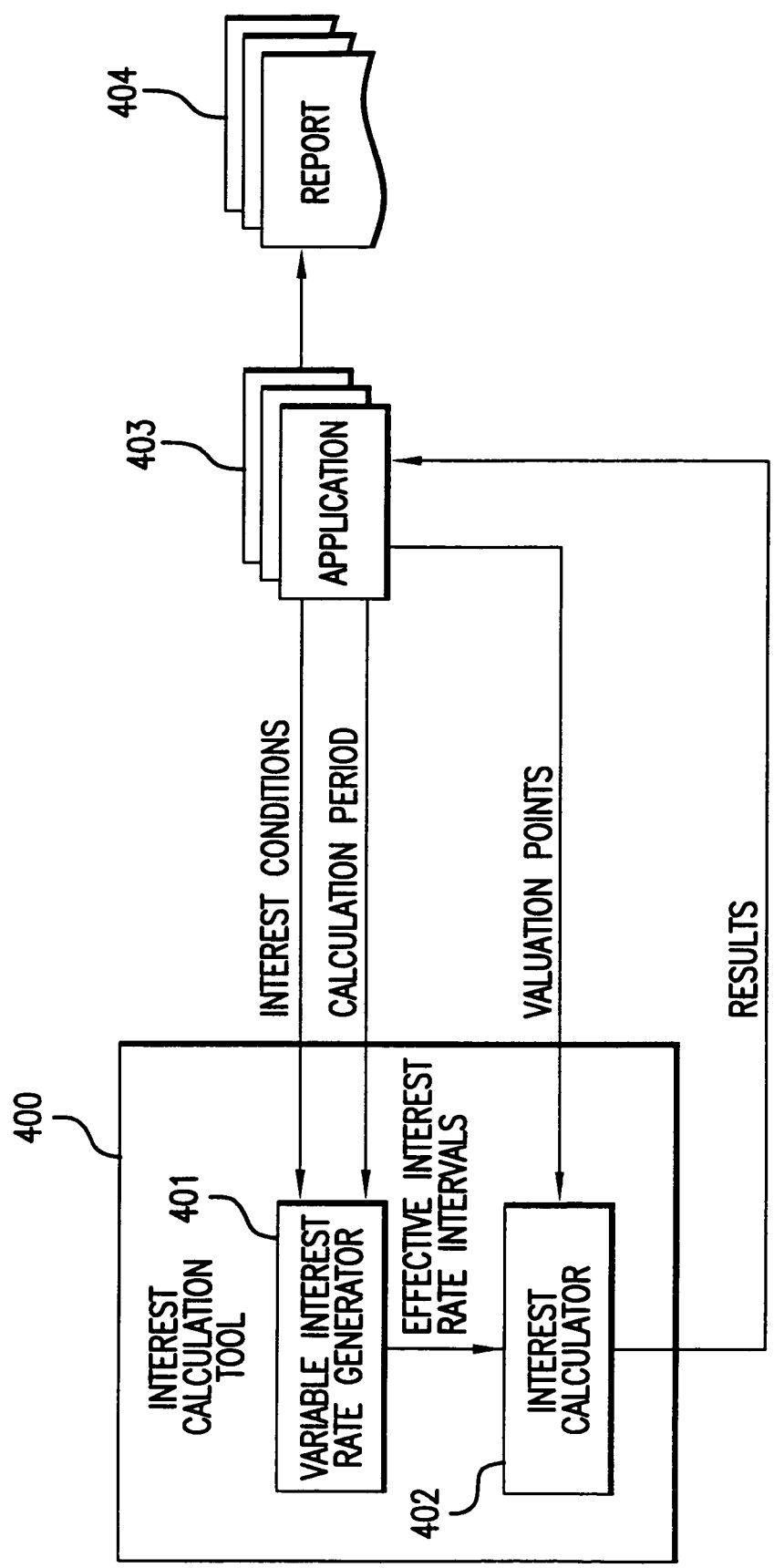
FIG. 4 illustrates elements of a system according to embodiments of the invention.

FIG. 4 shows a system according to embodiments of the present invention. The system may include an interest calculation tool 400 comprising computer-executable instructions. The tool 400 may comprise a variable interest rate generator 401 and an interest calculator 402. The tool 400 may receive data that it operates on from various software applications 403, such as banking account management applications. The applications 403 may, for example, supply interest conditions and a calculation period to the variable interest rate generator 401, and valuation points to the interest calculator 402. The interest conditions may include interest condition data points as described above. Based on the interest conditions and calculation period, the variable interest rate generator 401 may provide effective interest rate intervals for valuation intervals as described above, to the interest calculator 402. Using the information provided by the variable interest rate generator 401 and the valuation points provided by the applications, the interest calculator may calculate interest for the valuation intervals and return the calculated interest accruals or charges to the applications.

Using the results returned by the tool, the applications may, for example, credit an account with accrued interest, or debit an account with an interest charge. The applications may record information produced by tool 400, for example by storing it electronically on a machine-readable medium, and/or by producing a statement or report 404. For example, the applications, and corresponding operations by the interest calculation tool 400, could be executed at predetermined account "settlement" times. Settlement is a periodic operation in which interest and fees are calculated and reported to an account holder; for example, the monthly statement received by most holders of personal bank accounts is produced by settlement activities.

Figure 5:
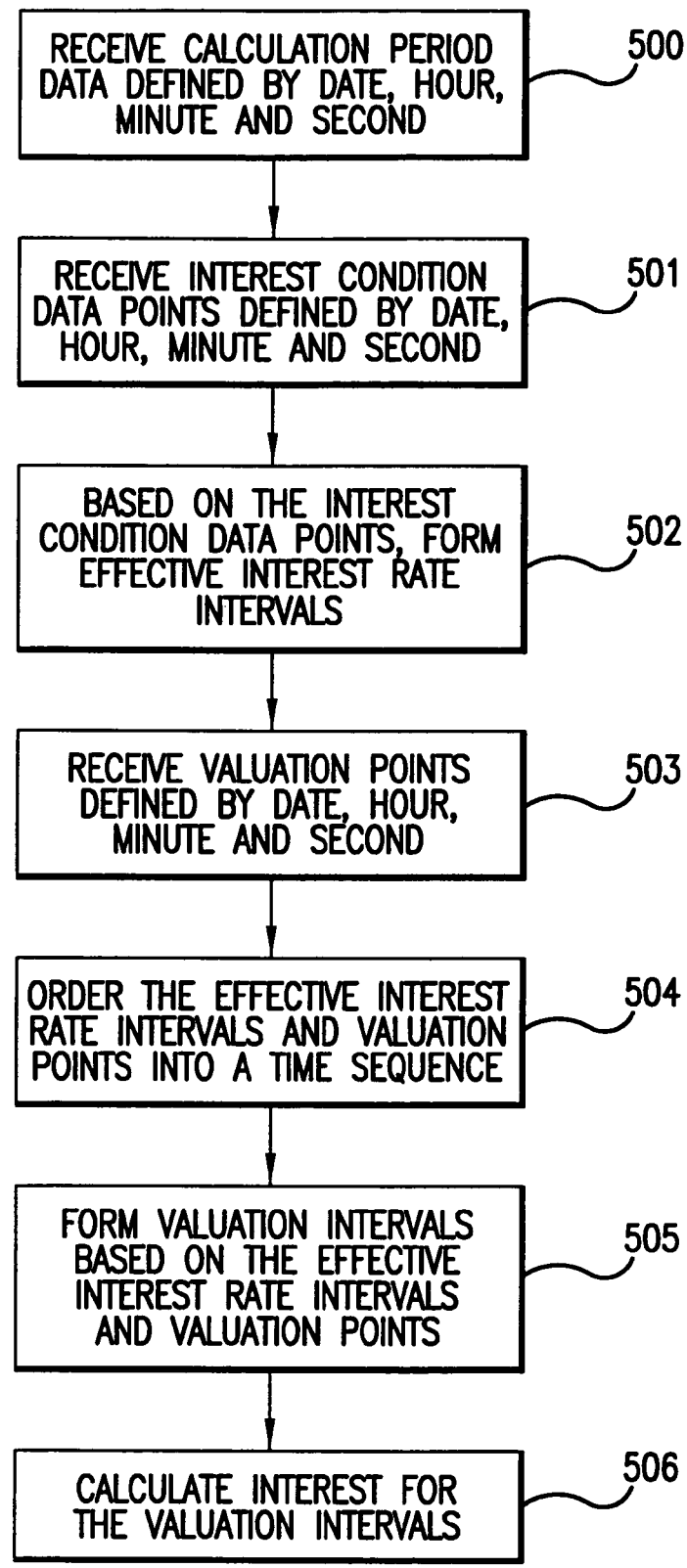
FIG. 5 shows a process flow according to embodiments of the invention.

In view of the foregoing, FIG. 5 shows a process flow according to embodiments of the present invention. As shown in block 500, computer-executable instructions according to embodiments of the invention, upon invocation thereof by a user, could receive calculation period data, including a start point and an end point, each point defined by date, hour, minute and second. As shown in block 501, the instructions could further receive interest condition data, including at least a starting interest condition data point and optionally including one or more subsequent interest condition data points, each interest condition data point having associated therewith an effective interest rate and an effective time point defined by date, hour, minute and second. Based on the interest condition data points, effective interest rate intervals may be formed, as shown in block 502.

As shown in block 503, the instructions may further receive valuation date data, including one or more valuation points after the start point and not exceeding the end point, each valuation point defined by date, hour, minute and second, and having associated therewith an account balance.

The instructions may order the effective interest rate intervals and valuation points in a time sequence, as shown in block 504, and form valuation intervals based on the effective interest rate intervals and valuation points, as shown in block 505. For each valuation interval, the instructions may calculate an interest, as shown in block 506.

Figure 6:
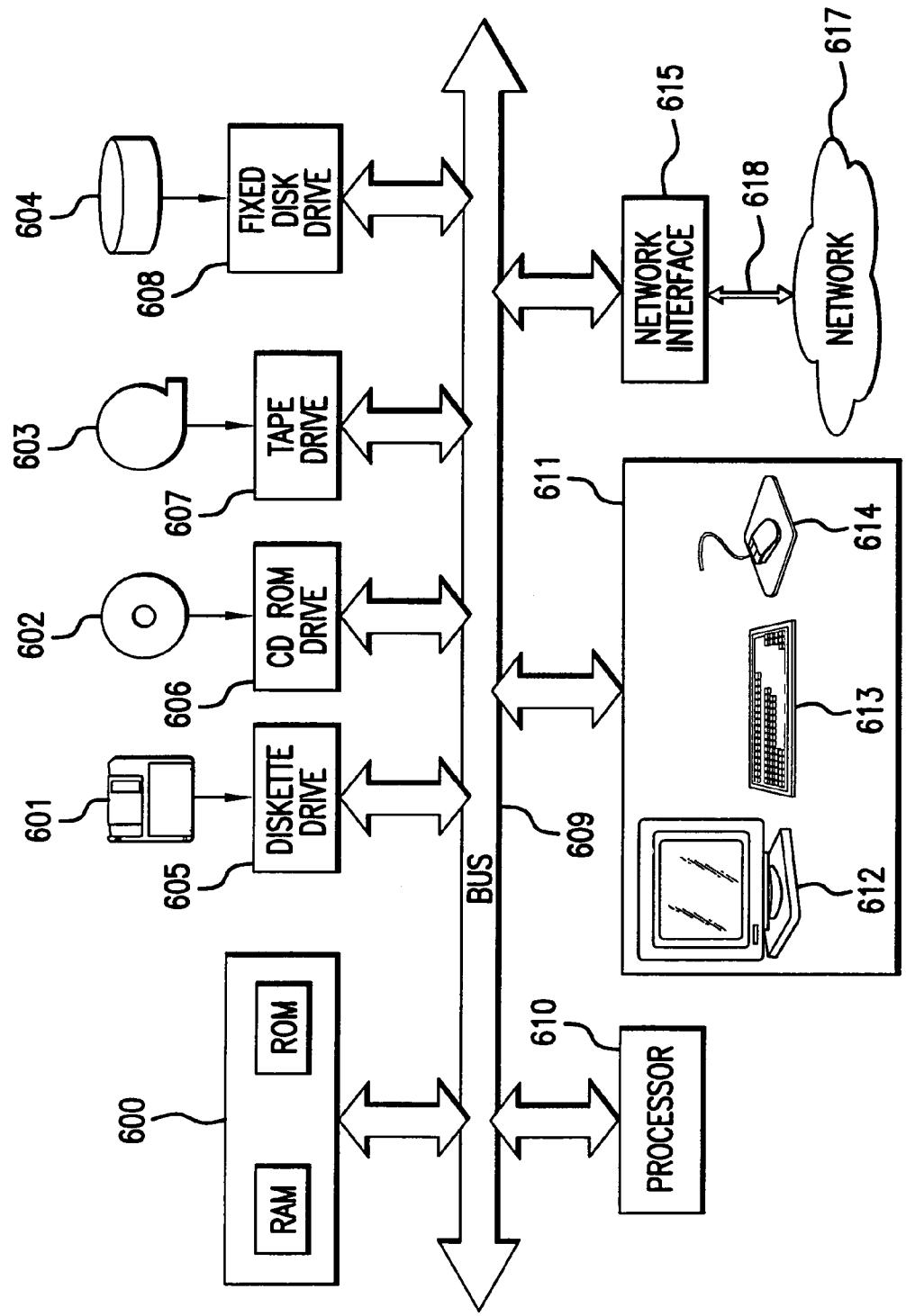
FIG. 6 shows an example of a computer system for implementing embodiments of the invention.

FIG. 6 shows a high-level representation of a computer system for implementing embodiments of the present invention, such as might be realized by a variety of known and commercially available hardware and software elements. The system comprises a memory 600 including ROM and RAM, processor 610 and user interface 611 comprising a video display 612, keyboard 613 and mouse 614. Elements may communicate via system bus 609. The system may further comprise a network 617 connected by a network medium 618 and network interface 615.

A computer program or collection of programs comprising computer-executable instructions according to embodiments of the present invention may be stored and transported on computer-usable media such as diskette 601, CD-ROM 602, magnetic tape 603 and fixed disk 604. To perform the embodiments, computer instructions may be retrieved from the computer-usable media 601-604 using their respective drives 605-608 into memory 600, and executed by a processor 610. The functionality disclosed hereinabove for performing the embodiments may find specific implementations in a variety of forms, which are considered to be within the abilities of a programmer of ordinary skill in the art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An automated method for calculating interest for an account over a selected time interval, comprising the steps of:
   at an interest calculation module, responsive to a request from an account management application to calculate an interest, performing the following steps:
      receiving electronically from the account management application, calculation period data, including a start point and an end point, each said point defined by date, hour, minute and second;
      receiving electronically from the account management application, interest condition data, including at least a starting interest data point and optionally including one or more subsequent interest data points, each said interest condition data point having associated therewith an effective interest rate and an effective time point defined by date, hour, minute and second;
      based on the interest condition data, forming electronically one or more effective interest rate intervals;
      receiving electronically from the account management application, valuation date data, including one or more valuation points after said starting date and not exceeding said ending date, each said valuation point defined by date, hour, minute, and second, and having associated therewith an account balance;
      ordering electronically said effective interest rate intervals and valuation points in a time sequence;
      forming electronically valuation intervals defined by said effective interest rate intervals and valuation points, each said valuation interval having associated therewith an effective interest rate and an account balance; and
      for each said valuation interval, calculating electronically an interest and returning the calculated interest from the interest calculation module to the account management application.

2. The method of claim 1, further comprising:
   for each said valuation interval, determining electronically a number of seconds in the interval;
   calculating electronically the interest on the account balance based on the number of seconds in the interval; and
   returning electronically the calculated interest from the interest calculation module to the account management application.

3. A method comprising:
   at an interest calculation module, responsive to a request from an account management application to calculate an interest, performing the following steps:
      defining electronically a calculation period for the calculation of interest on an account balance, wherein at least one of an effective interest rate and an account balance changes during the calculation period;
      dividing electronically the calculation period into intervals, where for each interval both the effective interest rate and account balance are constant;
      determining electronically a number of seconds in each interval;
      calculating electronically an interest on the account balance for each interval, based on the number of seconds and the effective interest rate for the interval; and
      returning electronically the calculated interest from the interest calculation module to the account management application.

4. The method of claim 3, further comprising recording electronically a result of the calculation.

5. A machine-readable medium storing computer-executable instruction to implement an automated method for calculating interest for an account over a selected time interval, the automated method comprising the steps of:
   at an interest calculation module, responsive to a request from an account management application to calculate an interest, performing the following steps:
      receiving from the account management application, calculation period data, including a start point and an end point, each said point defined by date, hour, minute and second;
      receiving from the account management application, interest condition data, including at least a starting interest data point and optionally including one or more subsequent interest data points, each said interest condition data point having associated therewith an effective interest rate and an effective time point defined by date, hour, minute and second;
      based on the interest condition data, forming one or more effective interest rate intervals;
      receiving from the account management application, valuation date data, including one or more valuation points after said starting date and not exceeding said ending date, each said valuation point defined by date, hour, minute, and second, and having associated therewith an account balance;

ordering said effective interest rate intervals and valuation points in a time sequence;

forming valuation intervals defined by said effective interest rate intervals and valuation points, each said valuation interval having associated therewith an effective interest rate and an account balance; and for each said valuation interval, calculating an interest and returning the calculated interest from the interest calculation module to the account management.

6. The machine-readable medium of claim 5, the automated method further comprising:

for each said valuation interval, determining a number of seconds in the interval;

calculating the interest on the account balance based on the number of seconds in the interval; and returning the calculated interest from the interest calculation module to the account management application.

7. A machine-readable medium storing computer-executable instructions to implement a method comprising:

at an interest calculation module, responsive to a request from an account management application to calculate an interest, performing the following steps:

defining a calculation period for the calculation of interest on an account balance, wherein at least one of an effective interest rate and an account balance changes during the calculation period;

dividing the calculation period into intervals, where for each interval both the effective interest rate and account balance are constant;

determining a number of seconds in each interval;

calculating an interest on the account balance for each interval, based on the number of seconds and the effective interest rate for the interval; and returning the calculated interest from the interest calculation module to the account management application.

8. The machine-readable medium of claim 7, the method further comprising recording a result of the calculation.

9. An interest calculation application adapted to respond to a request from an account management application to calculate an interest, comprising:

a variable interest rate generation module, adapted to:

receive calculation period data, including a start point and an end point, each point defined by date, hour, minute and second, receive interest condition data, including at least a starting interest data point and optionally including one or more subsequent interest data points, each interest condition data point having associated therewith an effective interest rate and an effective time point defined by date, hour, minute and second, and form one or more effective interest rate intervals based on the interest condition data;

an interest calculation module, adapted to:

receive valuation date data, including one or more valuation points after the starting date and not exceeding the ending date, each valuation point defined by date, hour, minute, and second, and having associated therewith an account balance;

order the effective interest rate intervals and valuation points in a time sequence;

form valuation intervals defined by said effective interest rate intervals and valuation points, each valuation interval having associated therewith an effective interest rate and an account balance; and calculate an interest for each valuation interval.

* * * * *